US011040679B2

(12) United States Patent
Hisada et al.

(10) Patent No.: US 11,040,679 B2
(45) Date of Patent: Jun. 22, 2021

(54) STRUCTURE OF VEHICLE (71) Applicant: Toyota Jidosha Kabushiki Kaisha, Toyota (JP)

(72) Inventors: Kohei Hisada, Nagoya (JP); Kazuki Ohtake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 50 days.

(21) Appl. No.: 16/715,454

(22) Filed: Dec. 16, 2019

(65) Prior Publication Data

US 2020/0238935 A1 Jul. 30, 2020

(30) Foreign Application Priority Data

Jan. 25, 2019 (JP) .............................. JP2019-011709

(51) Int. Cl.
*B60J 7/00* (2006.01)
*B60R 19/18* (2006.01)
*B60R 19/34* (2006.01)

(52) U.S. Cl.
CPC .............. *B60R 19/18* (2013.01); *B60R 19/34* (2013.01); *B60R 2019/186* (2013.01)

(58) Field of Classification Search
CPC ....... Y02T 10/64; Y02T 10/72; Y02T 10/645; Y02T 10/70; B60L 2200/26; B29C 66/71; B60R 21/0136; B60R 21/0132; B60N 2/2863; B60N 2/888
See application file for complete search history.

(56) References Cited

U.S. PATENT DOCUMENTS

| 6,179,355 | B1* | 1/2001 | Chou ...................... B60R 19/18 188/377 |
| 6,702,345 | B1* | 3/2004 | Yoshida .................. B60R 19/34 188/377 |
| 6,808,215 | B2* | 10/2004 | Sakuma .................. B60R 19/34 293/102 |
| 6,820,924 | B2* | 11/2004 | Caliskan ................ B62D 21/15 188/377 |

(Continued)

FOREIGN PATENT DOCUMENTS

| EP | 1707444 A1 | 10/2006 |
| JP | 2002-067840 A | 3/2002 |

(Continued)

*Primary Examiner* — Kiran B Patel
(74) *Attorney, Agent, or Firm* — Dinsmore & Shohl LLP (57) ABSTRACT

A structure of the vehicle includes a rear side member, a crush box and a bumper reinforcement. The rear side member is arranged outside in a width direction of the vehicle and is extended with a length direction of the rear side member coinciding with a longitudinal direction of the vehicle. The crush box plastically deforms through compression of the vehicle. The bumper reinforcement is provided with a hat-shaped open cross-section where a recess portion recessed outward with respect to the vehicle is provided in an inner surface of the bumper reinforcement in the longitudinal direction of the vehicle. A width of an open-end portion of the recess portion in a vertical direction of the vehicle is set larger than a width of the rear side member and a size of the crush box in the vertical direction of the vehicle.

5 Claims, 9 Drawing Sheets

(56) References Cited

U.S. PATENT DOCUMENTS

| | | | | |
|---|---|---|---|---|
| 7,976,082 B2* | 7/2011 | Song | ................ | B60R 19/34 |
| | | | | 293/133 |
| 9,004,576 B2* | 4/2015 | Sakakibara | .......... | B62D 25/085 |
| | | | | 296/187.09 |
| 9,061,637 B1* | 6/2015 | Yun | ................ | F16F 7/12 |
| 9,555,754 B2* | 1/2017 | Hara | ................ | B62D 21/152 |
| 9,592,780 B2* | 3/2017 | Wendel | ................ | B60R 19/26 |
| 9,630,582 B1 | 4/2017 | Faruque et al. | | |
| 9,789,833 B2* | 10/2017 | Taguchi | ................ | B60R 19/34 |
| 9,789,906 B1* | 10/2017 | Tyan | ................ | B62D 25/00 |
| 9,809,254 B2* | 11/2017 | De Leo | ................ | B62D 21/155 |
| 9,828,032 B2* | 11/2017 | Watanabe | ................ | B62D 25/082 |
| 9,834,086 B2* | 12/2017 | Iwamoto | ................ | B60K 11/04 |
| 9,834,160 B2* | 12/2017 | Staines | ................ | B60R 19/023 |
| 9,855,970 B2* | 1/2018 | Kitakata | ................ | B60R 19/12 |
| 9,932,071 B1* | 4/2018 | Rivellini | ................ | B62D 21/152 |
| 9,951,836 B2* | 4/2018 | Cazes | ................ | F16F 7/003 |
| 10,214,169 B2* | 2/2019 | Schneider | ................ | B60R 19/18 |
| 10,807,548 B2* | 10/2020 | Wada | ................ | B62D 25/08 |
| 2002/0149214 A1* | 10/2002 | Evans | ................ | B60R 19/18 |
| | | | | 293/120 |
| 2006/0022473 A1* | 2/2006 | Hansen | ................ | B60R 19/34 |
| | | | | 293/133 |
| 2007/0024069 A1 | 2/2007 | Takagi et al. | | |
| 2008/0106107 A1* | 5/2008 | Tan | ................ | B60R 19/34 |
| | | | | 293/133 |
| 2011/0204663 A1* | 8/2011 | Baccouche | ................ | B60R 19/18 |
| | | | | 293/102 |
| 2012/0267908 A1* | 10/2012 | Kokubo | ................ | B60R 19/34 |
| | | | | 293/133 |
| 2013/0300139 A1* | 11/2013 | Fukawatase | ................ | B60R 19/34 |
| | | | | 293/133 |
| 2014/0062107 A1* | 3/2014 | Kim | ................ | B60R 19/34 |
| | | | | 293/133 |
| 2014/0361560 A1* | 12/2014 | Sakakibara | ................ | B60R 19/34 |
| | | | | 293/133 |
| 2014/0361561 A1* | 12/2014 | Kuriyama | ................ | B62D 25/082 |
| | | | | 293/133 |
| 2014/0375082 A1 | 12/2014 | Watanabe | | |
| 2019/0176735 A1* | 6/2019 | Hisada | ................ | B60R 19/18 |

FOREIGN PATENT DOCUMENTS

| | | |
|---|---|---|
| JP | 2006-347442 A | 12/2006 |
| JP | 2007-038756 A | 2/2007 |
| WO | 2006068008 A1 | 6/2006 |
| WO | 2012101923 A1 | 8/2012 |
| WO | 2014087219 A1 | 6/2014 |

* cited by examiner

STRUCTURE OF VEHICLE

CROSS-REFERENCE TO RELATED APPLICATIONS

This application claims priority to Japanese Patent Application No. 2019-011709 filed on Jan. 25, 2019, which is incorporated herein by reference in its entirety.

BACKGROUND

1. Technical Field

The disclosure relates to a structure of a vehicle.

2. Description of Related Art

In Japanese Patent Application Publication No. 2007-038756 (JP 2007-038756 A), there is disclosed a structure of a vehicle in which one end of a crush box is attached to one end of each of a pair of side members that extend in a longitudinal direction of the vehicle, and each of both end-portions of a bumper reinforcement that extends in a width direction of the vehicle is attached to the other end of the crush box. According to this configuration, when a collision load is input to the bumper reinforcement from outside the vehicle, the crush box is plastically deformed through compression due to the load transmitted from the bumper reinforcement, and absorbs the energy in the event of the collision.

SUMMARY

By the way, when the collision load is input to the bumper reinforcement from outside the vehicle, the bumper reinforcement may rotate around an axis in the width direction of the vehicle, depending on a region of the collision. In this case, a region of the bumper reinforcement that originally serves as a reaction force surface inclines, so a path through which collision energy is transmitted to the crush box may be affected.

In particular, in the event of an offset collision of a front portion or a rear portion of the vehicle, the collision load is mainly input to one side of the bumper reinforcement in a length direction of the bumper reinforcement. Therefore, the crush box can be plastically deformed through compression on the collision side, but the load is unlikely to be transmitted to the crush box on the other side in the length direction. As a result, the energy absorption performance in the event of the collision may deteriorate.

In view of the aforementioned fact, the disclosure provides a structure of a vehicle that can effectively transmit a collision load input to a bumper reinforcement to a crush box in the event of a collision of a front portion or a rear portion of the vehicle.

An aspect of the disclosure relates to a structure of a vehicle that is equipped with a side member, a crush box, and a bumper reinforcement. The side member is arranged at each of both end portions of a front portion or a rear portion of the vehicle in a width direction of the vehicle, and is extended with a length direction of the side member coinciding with a longitudinal direction of the vehicle. The crush box assumes a cylindrical shape. One end of the crush box is fixed to an outer end portion of the side member in the longitudinal direction of the vehicle. The crush box is arranged with a length direction of the crush box coinciding with the longitudinal direction of the vehicle. Also, the crush box is configured to plastically deform through compression in the longitudinal direction of the vehicle due to inputting of a collision load inward in the longitudinal direction of the vehicle. The bumper reinforcement is arranged with a length direction of the bumper reinforcement coinciding with the width direction of the vehicle, at an outer end portion side of the crush box in the longitudinal direction of the vehicle. The other end of the crush box is fixed to an inner side of the bumper reinforcement in the longitudinal direction of the vehicle. The bumper reinforcement is provided with a hat-shaped open cross-section where a recess portion recessed outward with respect to the vehicle is provided in an inner surface of the bumper reinforcement in the longitudinal direction of the vehicle. Furthermore, a width of an open-end portion of the recess portion of the bumper reinforcement in a vertical direction of the vehicle is set larger than a size of the side member in the vertical direction of the vehicle.

Moreover, the width of the open-end portion of the recess portion in the vertical direction of the vehicle is set larger than a size of the crush box in the vertical direction of the vehicle.

According to the above-mentioned structure of the vehicle, the collision load is input to the bumper reinforcement from outside the vehicle, in the event of a collision of the front portion or the rear portion of the vehicle.

It should be noted herein that the recess portion recessed outward with respect to the vehicle is provided in the inner surface of the bumper reinforcement in the longitudinal direction of the vehicle. Besides, the size of the open-end portion of the recess portion in the vertical direction of the vehicle is set larger than the sizes of the side member and the crush box in the vertical direction of the vehicle. Therefore, after the crush box that is close to the collision region of the bumper reinforcement is plastically deformed through compression in the longitudinal direction of the vehicle after the collision, one end of the deformed crush box and one end of the deformed side member are inserted and fitted into the recess portion. Thus, the side member restrains the bumper reinforcement from rotating, and the position of the original reaction force surface of the bumper reinforcement can be maintained. As a result, for example, the collision load is effectively transmitted to the crush box, which is spaced apart from the collision region, via the bumper reinforcement.

As described above, according to the above-mentioned structure of the vehicle, an effect of making it possible to effectively transmit the collision load input to the bumper reinforcement to the crush box in the event of a collision of the front portion or the rear portion of the vehicle is achieved.

In the structure of the vehicle of the aforementioned aspect, a size of the recess portion in the vertical direction of the vehicle may be set in such a manner as to increase from an outer end portion of the recess portion in the longitudinal direction of the vehicle toward an inner end portion of the recess portion in the longitudinal direction of the vehicle, in at least each of both side regions of the bumper reinforcement in the width direction of the vehicle.

According to the above-mentioned structure of the vehicle, the size of the recess portion in the vertical direction of the vehicle is set in such a manner as to increase from the outer end portion of the recess portion in the longitudinal direction of the vehicle toward the inner end portion (the open-end portion) of the recess portion in the longitudinal direction of the vehicle, in the outer region of the bumper reinforcement corresponding to the side member and the crush box in the width direction of the vehicle. Therefore, the open-end portion of the recess portion is likely to be flared in the vertical direction of the vehicle, by the crush box and the side member that are inserted into the recess portion as a result of a collision of the front portion or the rear portion of the vehicle. Thus, the upper wall portion and the lower wall portion of the recess portion are restrained from being deformed by being bent into the recess portion due to an impact in the event of a collision, and one end of the crush box and one end of the side member are efficiently inserted into the recess portion.

According to the above-mentioned structure of the vehicle, an effect of making it possible to restrain the upper wall portion or the lower wall portion of the recess portion of the bumper reinforcement from being deformed by being bent into the recess portion and effectively transmit the collision load to the crush box in the event of a collision of the front portion or the rear portion of the vehicle is achieved.

In the above-mentioned structure of the vehicle, the size of the crush box in the vertical direction of the vehicle may be set in such a manner as to decrease from the one end of the crush box in a length direction of the crush box that is fixed to the side member toward the other end of the crush box in the length direction of the crush box that is fixed to the bumper reinforcement.

According to the above-mentioned structure of the vehicle, the size of the crush box in the vertical direction of the vehicle is smaller at the other end of the crush box fixed to the bumper reinforcement than at the one end of the crush box fixed to the side member. Therefore, after the crush box is plastically deformed through compression as a result of the event of a collision of the front portion or the rear portion of the vehicle, the other end of the crush box on the bumper reinforcement side becomes likely to be inserted into the recess portion.

As a result, one end of the crush box plastically deformed through compression is swiftly inserted into the recess portion of the bumper reinforcement that is about to rotate around the axis in the width direction of the vehicle as a result of a collision, and the open-end portion of the recess portion can be effectively guided to one end of the side member.

According to the above-mentioned structure of the vehicle, an effect of making it possible to more effectively transmit the collision load input to the bumper reinforcement to the crush box by realizing a structure in which one end of the crush box is likely to be inserted into the recess portion in the event of a collision of the front portion or the rear portion of the vehicle is achieved.

In the above-mentioned structure of the vehicle, the size of the recess portion in the vertical direction of the vehicle may be set in such a manner as to increase from an outer end portion of the recess portion in the longitudinal direction of the vehicle toward an inner end portion of the recess portion in the longitudinal direction of the vehicle, in an outer region of the bumper reinforcement in the width direction of the vehicle. The size of the recess portion in the vertical direction of the vehicle may be set in such a manner as to become substantially constant from an outer end portion of the recess portion in the longitudinal direction of the vehicle toward an inner end portion of the recess portion in the longitudinal direction of the vehicle, in a central region of the bumper reinforcement in the width direction of the vehicle.

According to the above-mentioned structure of the vehicle, there is adopted a configuration in which one end of the side member and one end of the crush box are likely to be inserted into the recess portion in the event of a collision, by increasing the size of the recess portion in the vertical direction of the vehicle toward the inner end portion (the open-end portion) of the recess portion in the longitudinal direction of the vehicle, in the outer region of the bumper reinforcement in the width direction of the vehicle. On the other hand, the upper wall portion and the lower wall portion of the recess portion are arranged substantially parallel in the longitudinal direction of the vehicle, and the reaction force to the collision load that is input along the longitudinal direction of the vehicle is enhanced, by making the size of the recess portion in the vertical direction of the vehicle substantially constant in the central region of the bumper reinforcement in the width direction of the vehicle.

Thus, in the event of an offset collision of the front portion or the rear portion of the vehicle, the load can be effectively transmitted to the crush box on the collision side on the other side in the length direction by inserting one end of the side member into the recess portion, on the collision side as one side of the bumper reinforcement in the width direction of the vehicle. On the other hand, in the event of, for example, a full-wrap collision of the vehicle, the load can be effectively transmitted to the crush box arranged on each of the right side and the left side by enhancing the reaction force of the central region of the bumper reinforcement to which the collision load is input from a barrier.

According to the above-mentioned structure of the vehicle, an effect of making it possible to more effectively transmit the collision load input to the bumper reinforcement to the crush box in the event of an offset collision and a full-wrap collision of the front portion or the rear portion of the vehicle is achieved.

In the above-mentioned structure of the vehicle, a rear-end portion of the crush box in the longitudinal direction of the vehicle may be inserted in the recess portion of the bumper reinforcement, and may be directly linked with a longitudinal wall portion of a rear-end portion of the recess portion in the longitudinal direction of the vehicle.

According to the above-mentioned structure of the vehicle, the rear-end portion of the crush box in the longitudinal direction of the vehicle is directly linked with the longitudinal wall portion of the rear-end portion of the recess portion in the longitudinal direction of the vehicle, so the length of the crush box can be lengthened by the depth of the recess portion in the longitudinal direction of the vehicle. Therefore, the crush stroke in the event of an offset collision or a full-wrap collision of the rear portion of the vehicle increases, and the amount of collision energy absorbed by the crush box can be increased.

According to the above-mentioned structure of the vehicle, an effect of making it possible to absorb a larger amount of collision energy input to the bumper reinforcement by the crush box in the event of an offset collision or a full-wrap collision of the rear portion of the vehicle is achieved.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

A structure of a vehicle according to the present embodiment of the disclosure will be described hereinafter based on FIGS. 1 to 4. Incidentally, arrows FR, UP, and RH shown appropriately in the respective drawings denote a front side of the vehicle, an upper side of the vehicle, and a right side of the vehicle, respectively. Besides, when the following description is given simply through the use of a longitudinal direction, a vertical direction, and a lateral direction, the longitudinal direction of the vehicle, the vertical direction of the vehicle, and the lateral direction in the case where the vehicle is directed in a traveling direction will be meant respectively, unless otherwise specified.

Figure 1:
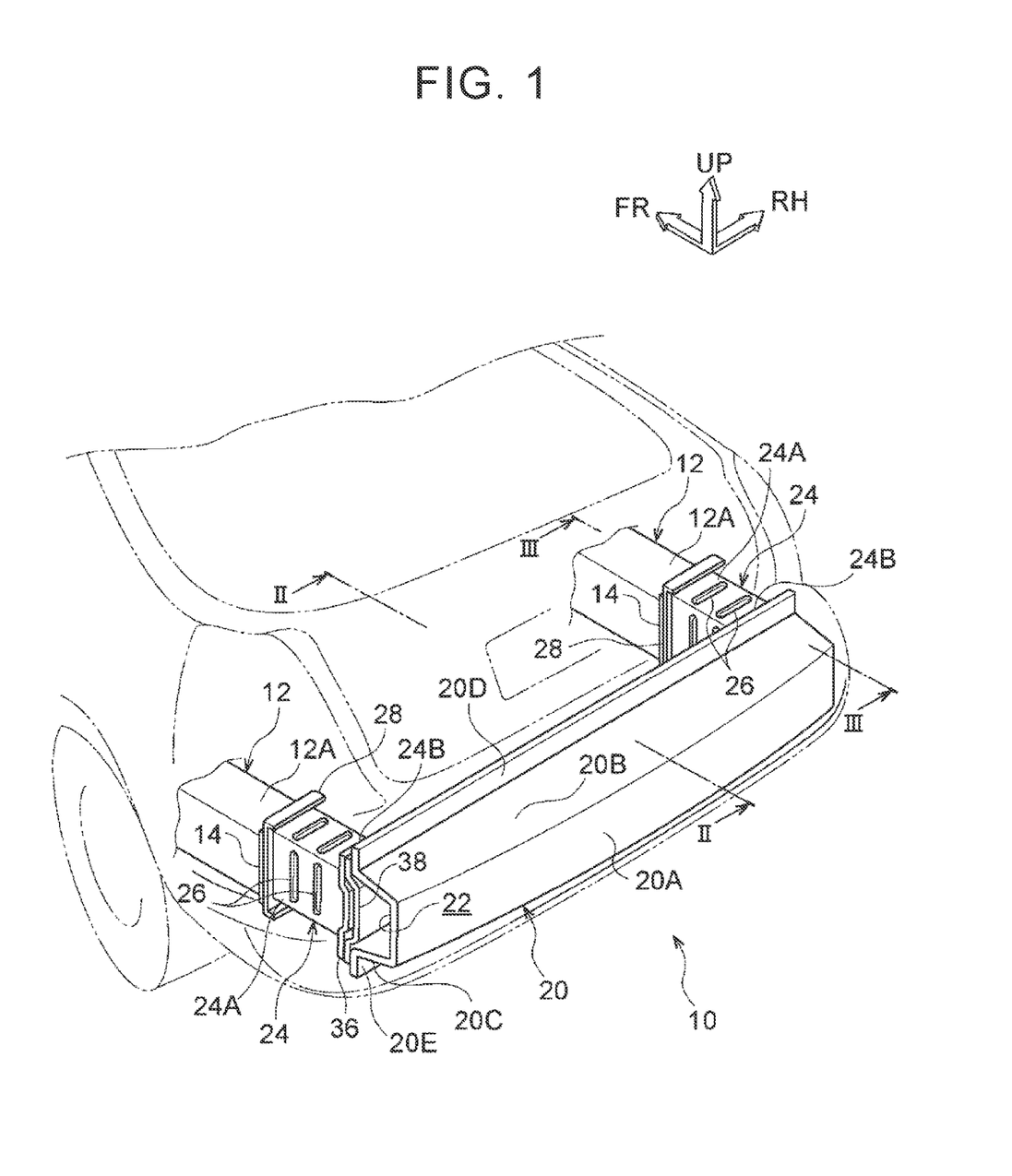
FIG. 1 is a partial perspective view schematically showing a rear portion of a vehicle to which a structure of the vehicle according to the embodiment of the disclosure is applied.

The outline of the structure of the vehicle will be described. FIG. 1 shows, in a perspective view, a rear portion 10 of a vehicle to which the structure of the vehicle according to the disclosure is applied. As shown in FIG. 1, a pair of right and left rear side members 12 that each extend with a length direction thereof coinciding with the longitudinal direction of the vehicle are disposed on both sides of the rear portion 10 of the vehicle in the width direction of the vehicle, respectively. Each of the rear side members 12 is made of steel, and is configured with a hollow rectangular closed cross-sectional structure. Incidentally, each of the rear side members 12 is an example of "the side member" in the disclosure.

Figure 3:
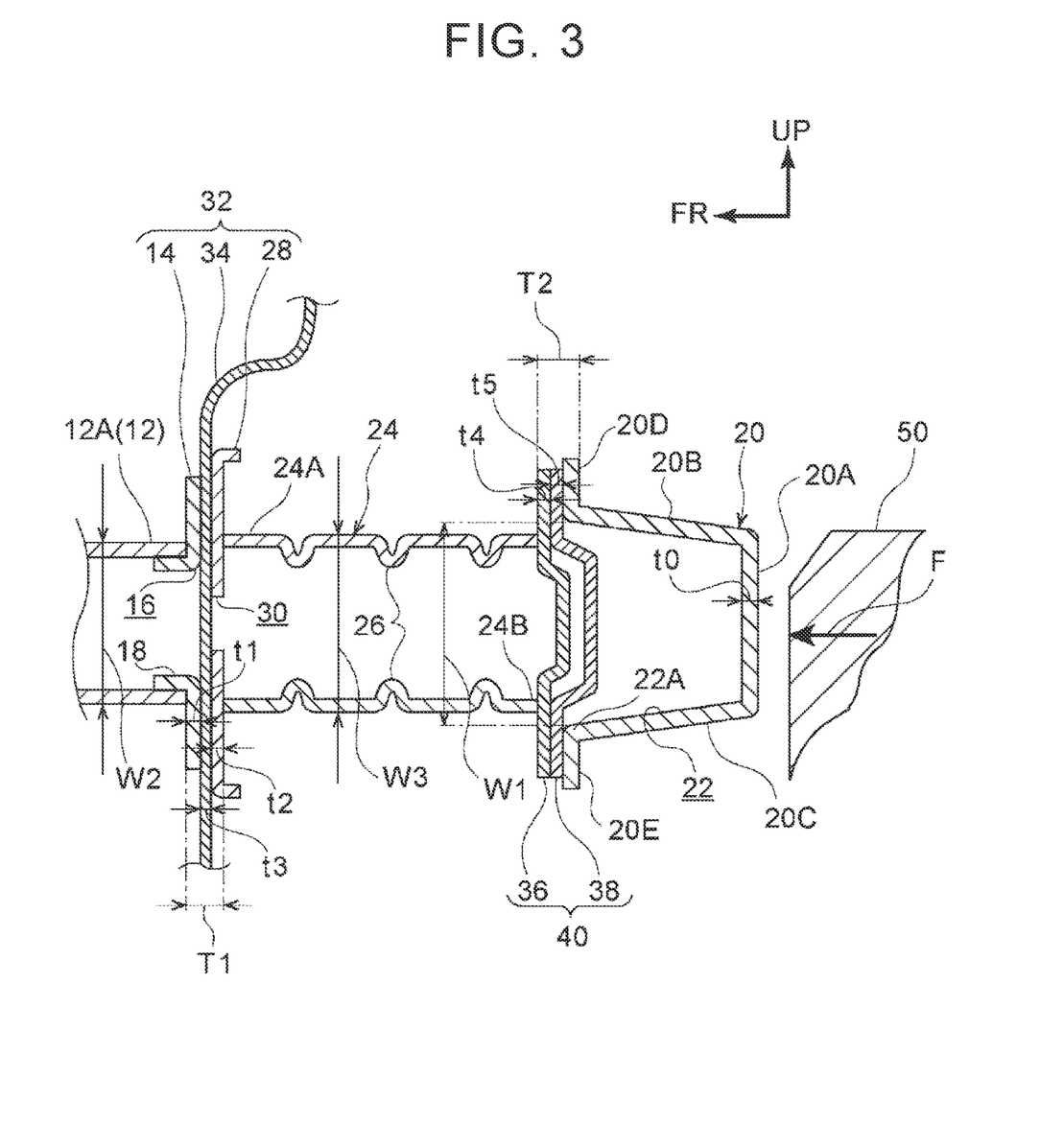
FIG. 3 is an enlarged cross-sectional view of a part of the structure of the vehicle shown in FIG. 1 along a line III-III, in a state before an offset collision of a barrier with the rear portion of the vehicle.

Besides, as shown in FIGS. 1 and 3, first plates 14 as steel plates are arranged at rear-end portions 12A of the rear side members 12 respectively. The first plates 14 are each formed in the shape of a rectangular plate whose plate thickness direction coincides with the longitudinal direction of the vehicle, and are large enough to be able to cover the rear-end portions 12A of the rear side member 12 from a rear side of the vehicle. Besides, a rectangular opening portion 16 that penetrates in the plate thickness direction is provided through a center of each of these first plates 14, and a cylindrical portion 18 that extends forward with respect to the vehicle from a peripheral edge of the rectangular opening portion 16 is provided at the center of each of the first plates 14. In each of the first plates 14 configured as described above, the cylindrical portion 18 is inserted in each of the rear side members 12, and the peripheral edge portion of the rectangular opening portion 16 is linked with the rear-end portion 12A of each of the rear side members 12 according to a method such as welding or the like. In this state, an outer edge portion of each of the first plates 14 is arranged outside each of the rear side members 12 as viewed in the longitudinal direction of the vehicle, and serves as a connection portion to be connected to a second plate 28 that will be described later.

Incidentally, it is also appropriate to adopt a configuration in which each of the first plates 14 is not provided at the center thereof with the rectangular opening portion 16 or the cylindrical portion 18.

On the other hand, as shown in FIG. 1, a bumper reinforcement 20 arranged with a length direction thereof coinciding with the width direction of the vehicle is disposed on a rear-end portion side (an outer-end portion side in the longitudinal direction of the vehicle) of the rear portion 10 of the vehicle. The bumper reinforcement 20 is made of a steel plate, and is molded according to a method such as press molding, bending work, or the like. Besides, a groove-like recess portion 22 that extends with a length direction thereof coinciding with the width direction of the vehicle and that is recessed backward with respect to the vehicle (outward with respect to the vehicle) is provided in a back surface of the bumper reinforcement 20 (an inner surface thereof with respect to the vehicle in the longitudinal direction of the vehicle). The other details of the bumper reinforcement 20 will be described later.

Figure 2:
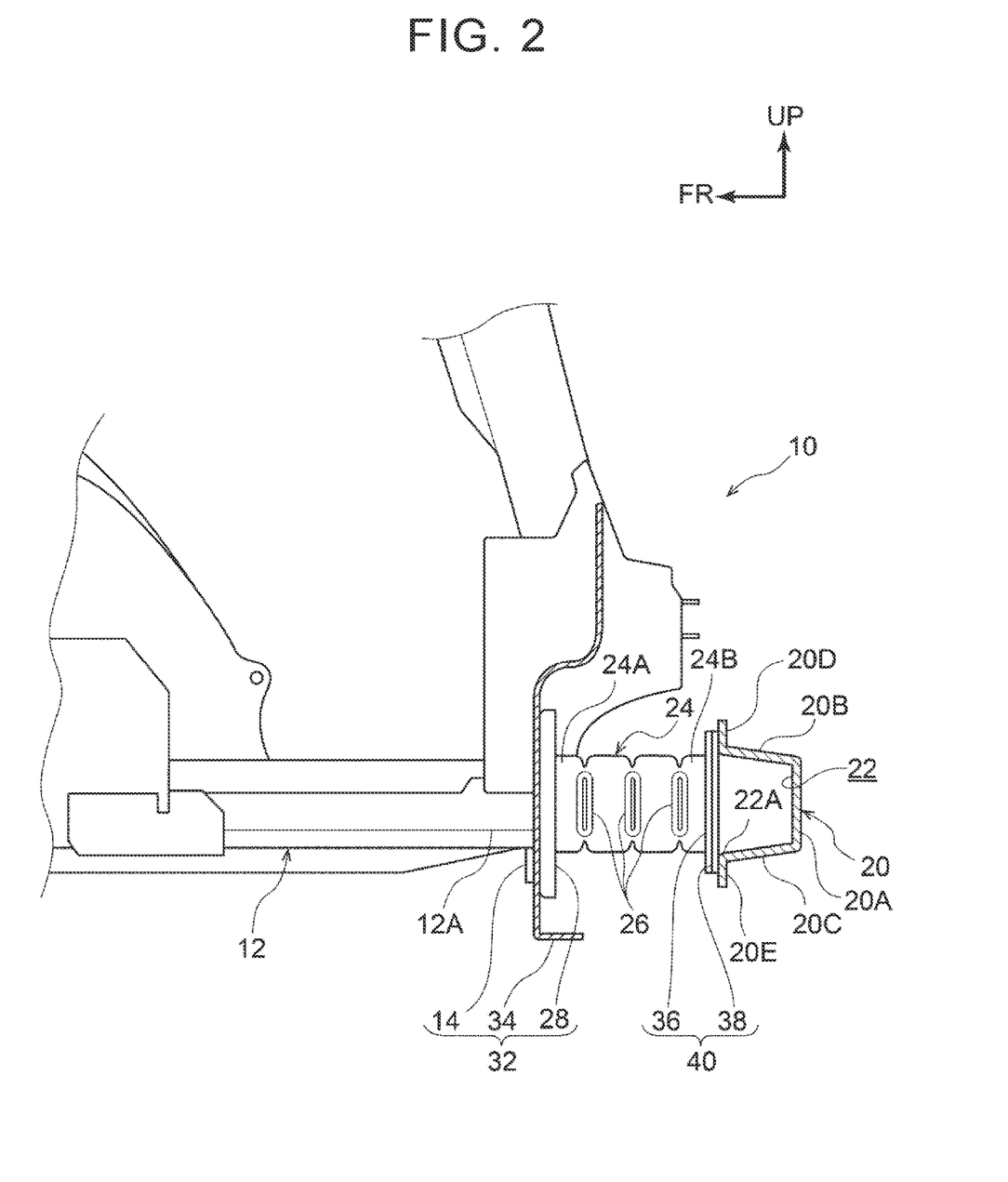
FIG. 2 is a longitudinal cross-sectional view of the structure of the vehicle shown in FIG. 1 along a line II-II.

As shown in FIGS. 1 to 3, a cylindrical crush box 24 whose length direction coincides with the longitudinal direction of the vehicle is arranged between the rear-end portion 12A of each of the above-mentioned rear side members 12 and an outer-end portion of the bumper reinforcement 20 in the width direction of the vehicle. More specifically, this crush box 24 is formed in the shape of an octagonal cylinder, by welding an open-end portion of an upper member (no reference symbol is assigned thereto) formed with a substantially U-shaped cross-section and an open-end portion of a lower member (no reference symbol is assigned thereto) formed with a substantially U-shaped cross-section to each other.

Besides, a plurality of recessed beads 26 are integrally provided in an outer peripheral portion of the crush box 24. The plurality of the recessed beads 26 are provided at predetermined intervals in the longitudinal direction of the vehicle, and plastically deform through compression in the longitudinal direction of the vehicle through the inputting of a collision load to the front side of the vehicle. Accordingly, the crush box 24 is collapsed into concertinas through the inputting of the collision load to the front side of the vehicle.

Besides, the second plate 28 as a steel plate is arranged at a front-end portion 24A of the crush box 24 (one end in the length direction thereof). The second plate 28 is formed in the shape of a rectangular plate whose plate thickness direction coincides with the longitudinal direction of the vehicle, is much larger than the above-mentioned first plate 14, and is large enough to be able to cover the front-end portion 24A of the crush box 24 from the front side of the vehicle. Besides, an opening portion 30 arranged coaxially with the rectangular opening portion 16 of the first plate 14 is provided through a center of the second plate 28. A peripheral edge portion of the opening portion 30 of the second plate 28 configured as described above is linked with the front-end portion 24A of the crush box 24 through the use of a method such as welding or the like. Furthermore, an outer edge portion of the second plate 28 that is arranged outside the crush box 24 as viewed in the longitudinal direction of the vehicle serves as a connection portion to be connected to the first plate 14.

The outer edges of both the first plate 14 and the second plate 28 are fastened to each other at a plurality of points by bolts (not shown) and nuts (not shown). Incidentally, a fastening portion of the first plate 14 and the second plate 28 will be referred to hereinafter as a first connection portion 32. Besides, at the first connection portion 32 of the present embodiment, a lower portion of a lower back panel 34 that constitutes a lower edge portion of a backdoor opening portion (no reference symbol is assigned thereto) of the rear portion 10 of the vehicle is arranged between the first plate 14 and the second plate 28, and is fastened together therewith (see FIG. 3). Thus, the front-end portion 24A of the crush box 24 and the rear side member 12 are integrated with each other. Incidentally, for the sake of the convenience of explanation, the lower back panel 34 is not shown in FIG. 1.

On the other hand, a third plate 36 as a steel plate is arranged at a rear-end portion 24B of the crush box 24 (the other end in the length direction thereof). The third plate 36 is formed in the shape of a rectangular plate whose plate thickness direction coincides with the longitudinal direction of the vehicle, and is large enough to be able to cover the rear-end portion 24B of the crush box 24. The rear-end portion 24B of the crush box 24 is linked with this third plate 36 through the use of a method such as welding or the like, and the outer edge portion of the third plate 36 serves as a connection portion between a fourth plate 38, which will be described later, and the bumper reinforcement 20.

Next, the configuration of the part of the structure of the vehicle will be described. As shown in FIGS. 2 and 3, the bumper reinforcement 20 is provided with a hat-shaped open cross-section that is open on the front side of the vehicle. In concrete terms, the bumper reinforcement 20 is composed of a longitudinal wall portion 20A that extends along the width direction of the vehicle and the vertical direction of the vehicle, an upper wall portion 20B flexed forward with respect to the vehicle from an upper-end portion of this longitudinal wall portion 20A, a lower wall portion 20C flexed forward with respect to the vehicle from a lower-end portion of the longitudinal wall portion 20A, an upper flange 20D flexed upward with respect to the vehicle from a front-end portion of the upper wall portion 20B, and a lower flange 20E flexed downward with respect to the vehicle from a front-end portion of the lower wall portion 20C. Thus, a groove-like recess portion 22 that extends with the length direction thereof coinciding with the width direction of the vehicle and that is recessed backward with respect to the vehicle (outward with respect to the vehicle) is provided in an intermediate portion of the bumper reinforcement 20 in the height direction thereof, by the longitudinal wall portion 20A, the upper wall portion 20B, and the lower wall portion 20C.

Besides, the upper wall portion 20B extends slightly inclined upward with respect to the vehicle, from a rear-end portion of the upper wall portion 20B toward a front-end portion thereof as viewed in the width direction of the vehicle. Besides, the lower wall portion 20C extends slightly inclined downward with respect to the vehicle, from a rear-end portion of the lower wall portion 20C toward a front-end portion thereof as viewed in the width direction of the vehicle. In other words, the upper wall portion 20B and the lower wall portion 20C are inclined away from each other in the vertical direction of the vehicle, from the rear-end portions of the upper wall portion 20B and the lower wall portion 20C toward the front-end portions thereof. Thus, there is adopted a configuration in which the size of the recess portion 22 in the vertical direction of the vehicle increases from a rear-end portion of the recess portion 22 (an outer-end portion thereof in the longitudinal direction of the vehicle) toward an open-end portion 22A of the recess portion 22 (an inner-end portion thereof in the longitudinal direction of the vehicle).

The fourth plate 38 as a steel plate is arranged inside the vehicle, in an outer region of the bumper reinforcement 20 configured as described above in the width direction of the vehicle. The fourth plate 38 is formed in the shape of a rectangular plate whose plate thickness direction coincides with the longitudinal direction of the vehicle, and is large enough to be able to cover the recess portion 22 from the front side of the vehicle in the outer region of the bumper reinforcement 20 in the width direction of the vehicle.

As shown in FIG. 3, an upper-end portion of the fourth plate 38 and an upper-end portion of the third plate 36 are superimposed on each other in this sequence, on the front side of the upper flange 20D of the bumper reinforcement 20 with respect to the vehicle. Also, the upper-end portion of the fourth plate 38 and the upper-end portion of the third plate 36 are fastened together at a plurality of points by bolts (not shown) and nuts (not shown). Besides, by the same token, a lower-end portion of the fourth plate 38 and a lower-end portion of the third plate 36 are superimposed on each other in this sequence, on the front side of the upper flange 20D of the bumper reinforcement 20 with respect to the vehicle as well. Also, the lower-end portion of the fourth plate 38 and the lower-end portion of the third plate 36 are fastened together at a plurality of points by bolts (not shown) and nuts (not shown). Thus, the rear-end portion 24B of the crush box 24 and the outer region of the bumper reinforcement 20 in the width direction of the vehicle are integrated with each other. Incidentally, a fastening portion of the third plate 36, the fourth plate 38, and the bumper reinforcement 20 will be described hereinafter as a second connection portion 40.

As described above, in the structure of the vehicle according to the present embodiment, the rear-end portion 12A of the rear side member 12 and the outer region of the bumper reinforcement 20 in the width direction of the vehicle are coupled to each other in the longitudinal direction of the vehicle by the crush box 24. Besides, the rear side member 12 and the crush box 24 are linked with each other via the first connection portion 32. Also, the crush box 24 and the bumper reinforcement 20 are linked with each other via the second connection portion 40.

Figure 4:
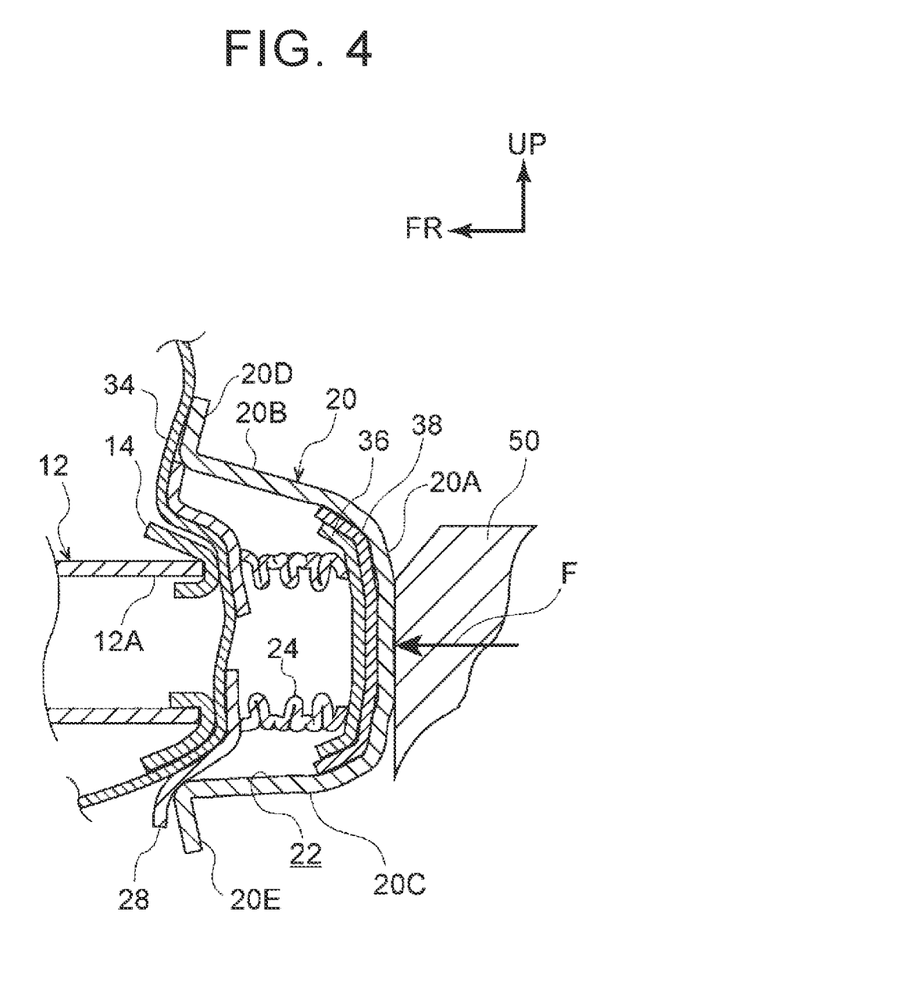
FIG. 4 is an enlarged cross-sectional view of the part of the structure of the vehicle shown in FIG. 1 along the line III-III, in a state after the offset collision of the barrier with the rear portion of the vehicle.

It should be noted herein that FIG. 3 is a cross-sectional view showing a state prior to an offset collision of a barrier 50 with the right side of the rear portion 10 of the vehicle in the width direction of the vehicle. Besides, FIG. 4 is a cross-sectional view showing a state after the offset collision of the barrier 50 with the right side of the rear portion 10 of the vehicle in the width direction of the vehicle. As shown in these drawings, when the barrier 50 collides with the rear portion 10 of the vehicle, a collision load F along the vertical direction of the vehicle is input to the bumper reinforcement 20. Subsequently, the collision load F is transmitted to the crush box 24 via the second connection portion 40, and the crush box 24 plastically deforms through compression in the longitudinal direction of the vehicle to absorb collision energy.

After that, due to the collision load F, the third plate 36 and the fourth plate 38 at the second connection portion 40 plastically deform to absorb collision energy. Then, the rear-end portion 24B of the crush box 24 is inserted into the recess portion 22. Furthermore, the collision load F is transmitted to the first connection portion 32 via the upper flange 20D and the lower flange 20E of the bumper reinforcement 20, and the first plate 14 and the second plate 28 plastically deform to absorb collision energy. Then, the rear-end portion 12A of the rear side member 12 is inserted into the recess portion 22. At this time, the upper wall portion 20B and the lower wall portion 20C of the recess portion 22 are plastically deformed in such a manner as to be slightly flared in the vertical direction of the vehicle to further absorb collision energy.

Incidentally, in the present embodiment, the bumper reinforcement 20 is a plate material having a substantially constant plate thickness t0. For example, the plate thickness t0 may be set equal to 2.3 mm. Besides, a size W1 of the open-end portion 22A of the recess portion 22 of the bumper reinforcement 20 in the vertical direction of the vehicle is set larger than a size W2 of the rear side member 12 in the vertical direction of the vehicle, and the bumper reinforcement 20 is large enough to be able to insert the rear-end portion 12A of the rear side member 12 into the recess portion 22 when the crush box 24 plastically deforms through compression in the longitudinal direction of the vehicle due to a collision of the rear portion of the vehicle. Incidentally, in this state, the crush box 24 plastically deformed through compression is accommodated in the recess portion 22. Therefore, in view of swift insertion of the rear-end portion 12A of the rear side member 12 into the recess portion 22, W1 may be set larger than a size W3 of the crush box 24 in the vertical direction of the vehicle before deformation through compression. In the present embodiment, for example, W1 is set equal to 110 mm, W2 is set equal to 75 mm, and W3 is set approximately equal to W2.

Furthermore, in order to swiftly insert the rear-end portion 12A of the rear side member 12 into the recess portion 22 of the bumper reinforcement, the size W1 of the open-end portion 22A of the recess portion 22 in the vertical direction of the vehicle may satisfy a conditional expression (1) shown below. It should be noted, however, that T1 denotes a plate thickness of the first connection portion 32 in the longitudinal direction of the vehicle, and that T2 denotes a plate thickness of the second connection portion 40 in the longitudinal direction of the vehicle.

$$W1 > W2 + 2 \times (T1 + T2) \quad (1)$$

In the present embodiment, T1 is the sum of the plate thicknesses of the first plate 14, the second plate 28, and the lower back panel 34 in the longitudinal direction of the vehicle. For example, a plate thickness t1 of the first plate 14 may be set equal to 2.6 mm, a plate thickness t2 of the second plate 28 may be set equal to 2.3 mm, and a plate thickness t3 of the lower back panel 34 may be set equal to 0.8 mm.

Besides, in the present embodiment, T2 is the sum of the plate thicknesses of the third plate 36 and the fourth plate 38 in the longitudinal direction of the vehicle. For example, a plate thickness t4 of the third plate 36 may be set equal to 2.3 mm, and a plate thickness t5 of the fourth plate 38 may be set equal to 2.3 mm.

That is, the plate thickness T1 of the first connection portion 32 in the longitudinal direction of the vehicle is set larger than the plate thickness T2 of the second connection portion 40. Thus, there is adopted a configuration in which the second connection portion 40, which is close to the barrier 50, and the first connection portion 32 begin to be plastically deformed through compression in this sequence, after plastic deformation of the crush box 24 through compression.

Next, the operation and effect of the present embodiment will be described. As shown in FIG. 3, when the right side of the rear portion 10 of the vehicle in the width direction of the vehicle collides with the barrier 50 in an offset manner, the collision load F is input to a right region of the bumper reinforcement 20 in the width direction of the vehicle, from outside the vehicle.

By the way, when the region that collides with the barrier 50 deflects toward an upper portion or a lower portion of the bumper reinforcement 20, the bumper reinforcement 20 may rotate around the axis in the width direction of the vehicle due to the collision load, and the longitudinal wall portion 20A, which originally serves as a reaction force surface of the bumper reinforcement 20, may incline in the vertical direction of the vehicle.

It should be noted herein that the recess portion 22 recessed backward with respect to the vehicle is provided in the back surface of the bumper reinforcement 20 in the present embodiment. Besides, the size W1 of the open-end portion 22A of the recess portion 22 in the vertical direction of the vehicle is set larger than the size W2 of the rear side member 12 in the vertical direction of the vehicle and the size W3 of the crush box 24 in the vertical direction of the vehicle. Therefore, after the crush box 24, which is close to the collision region of the bumper reinforcement 20, is plastically deformed through compression in the longitudinal direction of the vehicle after the collision, the deformed crush box 24 and the rear-end portion 12A of the rear side member 12 are inserted and fitted into the recess portion 22. Thus, the rear side member 12 restrains the bumper reinforcement 20 from rotating, and the position of the original reaction force surface of the bumper reinforcement 20 can be maintained. As a result, the collision load F can be effectively transmitted to the crush box 24, which is located on the collision side on the other side in the length direction (on the left side in the width direction of the vehicle) apart from the collision region, as well via the bumper reinforcement 20.

Besides, in the present embodiment, the size of the recess portion 22 in the vertical direction of the vehicle is set in such a manner as to increase from the rear-end portion of the recess portion 22 toward the open-end portion 22A thereof, in the outer region of the bumper reinforcement 20 corresponding to the rear side member 12 and the crush box 24 in the width direction of the vehicle. Therefore, the open-end portion of the recess portion 22 is likely to be flared in the vertical direction of the vehicle by the crush box 24 and the rear side member 12 that are inserted into the recess portion 22 as a result of a collision of the rear portion 10 of the vehicle. Thus, the upper wall portion 20B and the lower wall portion 20C of the recess portion 22 are restrained from being deformed by being bent into the recess portion 22, and one end of the crush box 24 and one end of the rear side member 12 can be efficiently inserted into the recess portion.

Besides, in the present embodiment, the plate thickness T2 of the second connection portion 40 that connects the crush box 24 and the bumper reinforcement 20 to each other in the longitudinal direction of the vehicle is set smaller than the plate thickness T1 of the first connection portion 32 that connects the rear side member 12 and the crush box 24 to each other in the longitudinal direction of the vehicle. Therefore, the second connection portion 40, which is close to the barrier 50, and the first connection portion 32 can be started being plastically deformed through compression in this sequence after plastic deformation of the crush box 24 through compression, and a bottoming load can be restrained from being generated in the event of a collision.

Besides, the recess portion 22 of the present embodiment is provided in the intermediate portion of the bumper reinforcement 20 in the height direction thereof, and is configured to extend with the length direction thereof coinciding with the width direction of the vehicle. Therefore, the rigidity of the cross-section of the bumper reinforcement 20 with an open cross-sectional structure is enhanced. Therefore, while the recess portion 22 restrains the plate thickness of the bumper reinforcement 20 from increasing, the efficiency of transmitting the load to the crush box 24 and the rigidity of the cross-section can both be enhanced. As a result, the weight of the bumper reinforcement 20 can be reduced.

Figure 5:
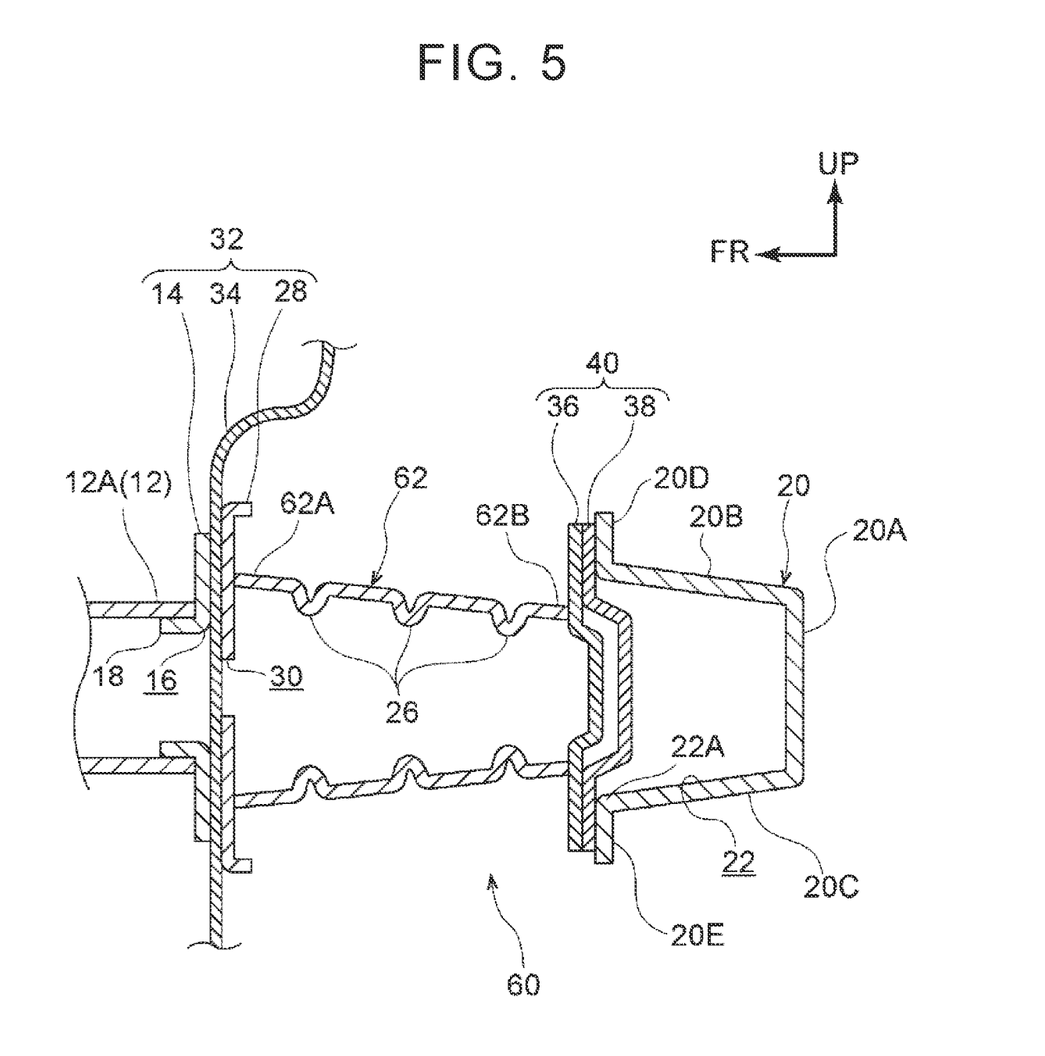
FIG. 5 is an enlarged cross-sectional view of a part of a crush box according to a first modification example of the present embodiment and corresponding to FIG. 3.

Next, a first modification example of the present embodiment will be described. At a rear portion 60 of the vehicle to which a structure of a vehicle according to the first modification example of the present embodiment is applied, as shown in FIG. 5, the size of a crush box 62 in the vertical direction of the vehicle is set in such a manner as to decrease from a front-end portion 62A of the crush box 62 fixed to the rear side member 12 toward a rear-end portion 62B of the crush box 62 fixed to the bumper reinforcement 20. In other words, the crush box 62 assumes a substantially trapezoidal shape as viewed in the width direction of the vehicle.

Figure 6A:
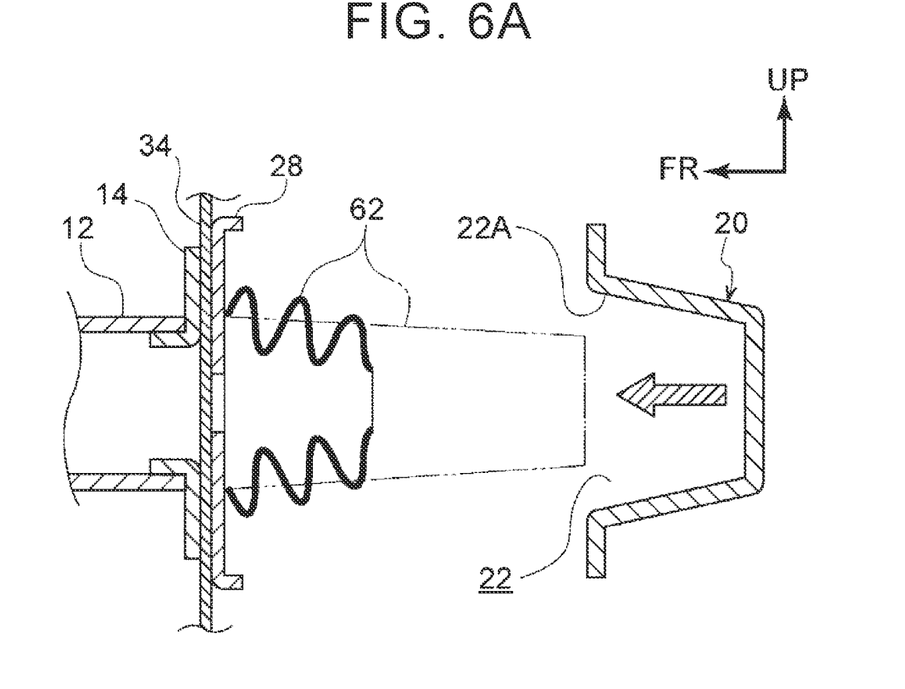
FIG. 6A is a schematic view showing, in a lateral view, an aspect of deformation of the crush box shown in FIG. 5 in the event of an offset collision of a vehicle to which a structure of the vehicle employing the crush box is applied with a barrier.
Figure 6B:
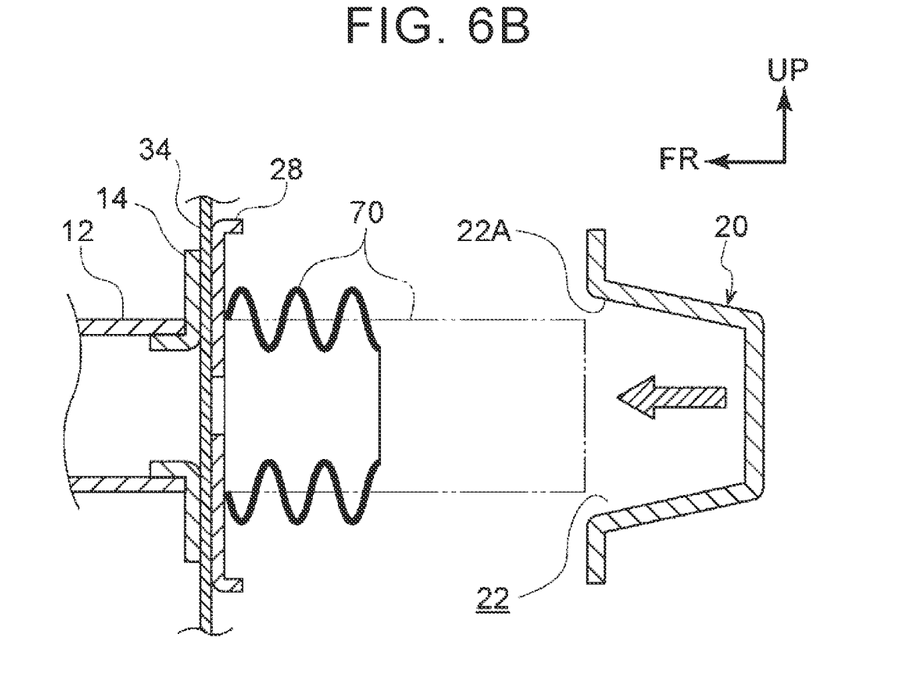
FIG. 6B is a schematic view showing, in a lateral view, an aspect of deformation of a crush box according to an example as a contrast with the crush box shown in FIG. 6A in the event of an offset collision of a vehicle to which a structure of the vehicle employing the crush box is applied with the barrier.

It should be noted herein that the form of the crush box 62 plastically deformed through compression due to an offset collision of the rear portion 10 of the vehicle is indicated by a solid line in FIG. 6A, and that the form of the crush box 62 before the offset collision is indicated by an alternate long and two short dashes line in FIG. 6A. On the other hand, FIG. 6B is a lateral view corresponding to FIG. 6A and showing a crush box 70 as an example to be contrasted with the crush box 62.

As shown in FIG. 6A, even when the crush box 62 according to the first modification example deforms into concertinas due to a collision load input to the front side of the vehicle, the dimension of the bumper reinforcement 20 side in the vertical direction of the vehicle can be restrained from increasing. Therefore, the rear-end portion of the bumper reinforcement 20 side can be more easily inserted into the recess portion 22 than in the case where the crush box is provided with the size thereof in the vertical direction of the vehicle substantially constant from the front-end portion thereof to the rear-end portion thereof as is the case with the crush box 70 shown in FIG. 6B. As a result, the collision load input to the bumper reinforcement 20 can be more effectively transmitted to the crush box 24.

Figure 7:
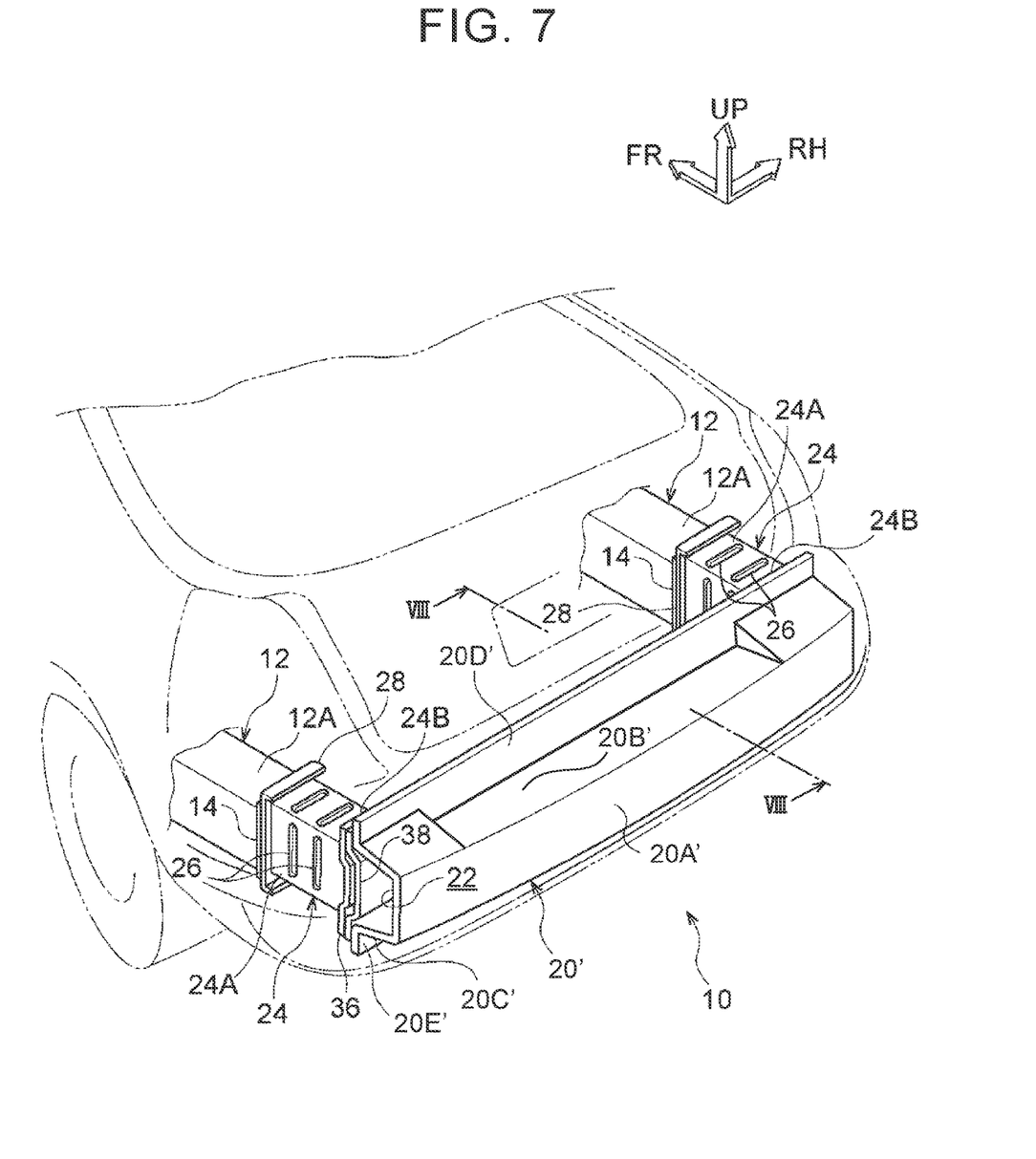
FIG. 7 is a partial perspective view schematically showing a rear portion of a vehicle to which a structure of the vehicle according to a second modification example of the embodiment is applied.
Figure 8:
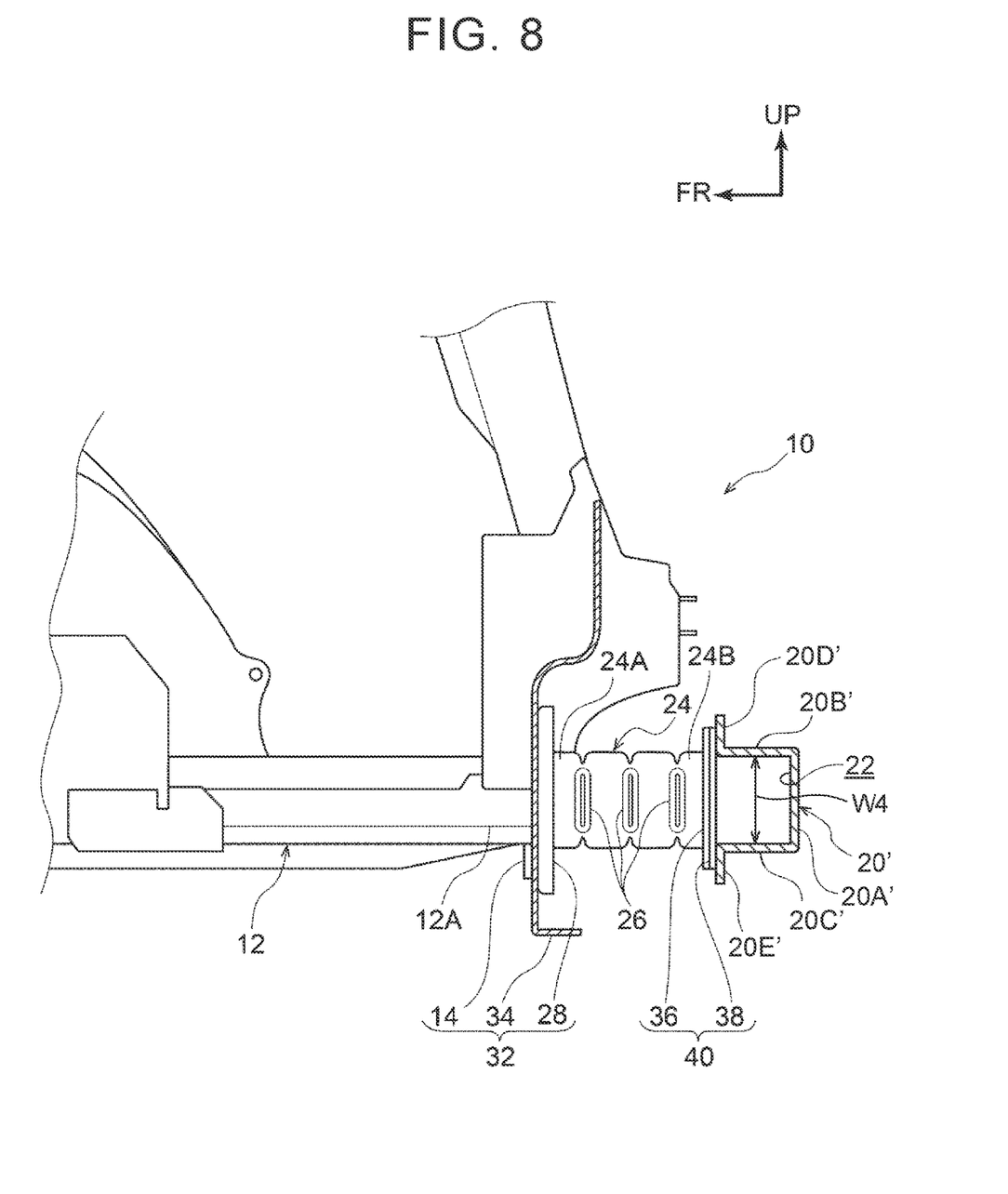
FIG. 8 is a longitudinal sectional view of the structure of the vehicle shown in FIG. 7 along a line VIII-VIII.

Next, a second modification example will be described. As shown in FIG. 7, a recess portion equivalent to the recess portion 22 of the present embodiment is provided in an inner surface of a bumper reinforcement 20' according to the second modification example of the present embodiment in the longitudinal direction of the vehicle. It should be noted herein that the size of the recess portion in the vertical direction of the vehicle is set in such a manner as to increase from an outer-end portion of the recess portion in the longitudinal direction of the vehicle toward an inner-end portion of the recess portion in the longitudinal direction of the vehicle, in an outer region of the bumper reinforcement 20' in the width direction of the vehicle. Then, as shown in FIG. 8, which is an enlarged cross-sectional view of the part of the structure of the vehicle along a line VIII-VIII, a size W4 of the recess portion in the vertical direction of the vehicle is set substantially constant from an outer-end portion of the recess portion in the longitudinal direction of the vehicle toward an inner-end portion thereof in the longitudinal direction of the vehicle, in a central region of the bumper reinforcement 20' in the width direction of the vehicle.

According to the aforementioned configuration, in the outer region of the bumper reinforcement in the width direction of the vehicle, the size of the recess portion in the vertical direction of the vehicle is increased toward the inner-end portion (the open-end portion) thereof in the longitudinal direction of the vehicle as is the case with the present embodiment. Thus, according to this configuration, the rear side member 12 and the rear-end portion 24B of the crush box 24 are likely to be inserted into the recess portion when a collision load on the front side of the vehicle is input to the rear portion 10 of the vehicle. On the other hand, in the central region of the bumper reinforcement in the width direction of the vehicle, the size of the recess portion in the vertical direction of the vehicle is made substantially constant. Thus, an upper wall portion and a lower wall portion of the recess portion are arranged substantially parallel in the longitudinal direction of the vehicle, and the reaction force to a collision load that is input along the longitudinal direction of the vehicle is enhanced.

Thus, in the event of, for example, an offset collision of the rear portion 10 of the vehicle, one end of a side member can be inserted into the recess portion, and a load can be effectively transmitted to a crush box on the collision side on the other side in the length direction, at one end of the collision side of the bumper reinforcement. On the other hand, in the event of, for example, a full-wrap collision of the vehicle, the reaction force of the central region of the bumper reinforcement to which a collision load is input from a barrier can be enhanced, and the load can be effectively transmitted to the crush box arranged on each of the right and left sides.

Figure 9:
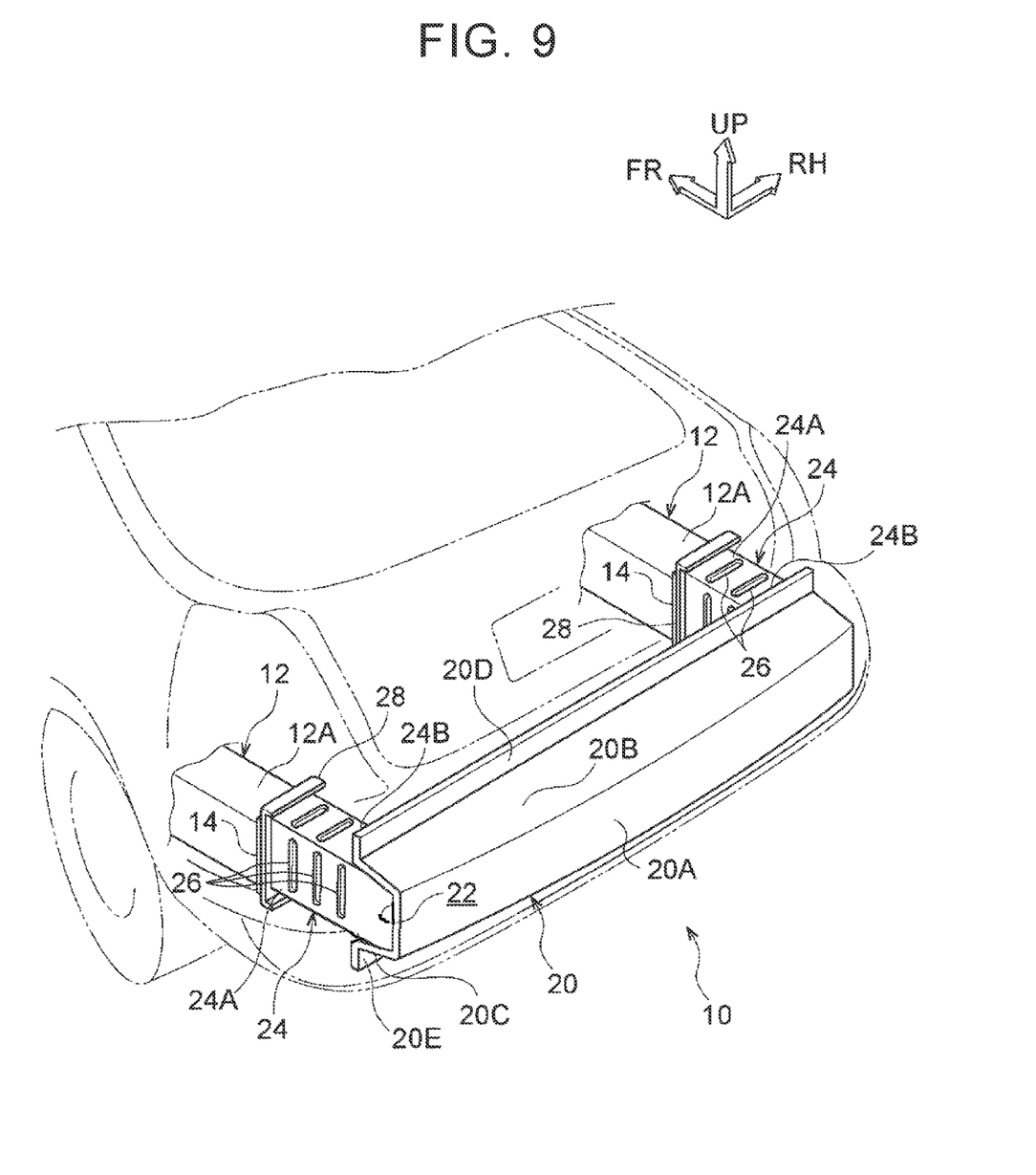
FIG. 9 is a partial perspective view schematically showing a rear portion of a vehicle to which a structure of the vehicle according to a third modification example of the embodiment is applied.

A third modification example of the aforementioned embodiment will be described hereinafter as an additional modification example. In each of the aforementioned embodiment and the first and second modification examples, there is adopted a configuration in which the rear-end portion 24B or 62B of the crush box 24 or 62 is connected via the third plate 36 and the fourth plate 38 that are arranged on the inner side of the bumper reinforcement 20 with respect to the vehicle, but the disclosure is not limited thereto. For example, as shown in FIG. 9, the structure of the vehicle of the third modification example may be configured such that a rear-end portion of a crush box is inserted in the recess portion 22 of the bumper reinforcement 20 and linked with the longitudinal wall portion 20A of the bumper reinforcement 20 either directly or via a member. According to this configuration, the length of the crush box can be lengthened by a depth of the recess portion 22 in the longitudinal direction of the vehicle. Therefore, the crush stroke in the event of an offset collision or a full-wrap collision of the rear portion of the vehicle increases, and the amount of collision energy absorbed by the crush box can be increased.

Next, a fourth modification example of the aforementioned embodiment will be described. In each of the aforementioned embodiment and the first, second, and third modification examples, there is adopted a configuration in which the recess portion 22 is extended over an entire region of the bumper reinforcement 20 in the width direction of the vehicle, but the disclosure is not limited thereto. The structure of the vehicle of the fourth modification example may be configured such that the recess portion is provided only in the outer region of the bumper reinforcement 20 in the width direction of the vehicle.

Besides, in each of the aforementioned embodiment and the modification examples, the rear side member 12, the bumper reinforcement 20, the crush box 24 or 62, the first plate 14, the second plate 28, the third plate 36, the fourth plate 38, and the lower back panel 34 are made of steel, but the disclosure is not limited thereto. Other metal materials, for example, a high-tension material, iron, and aluminum alloy are also applicable to these members.

Besides, in each of the aforementioned embodiment and the modification examples, the structure of the vehicle according to the disclosure is applied to the rear portion of the vehicle, but the disclosure is not limited thereto. The structure of the vehicle according to the disclosure may be applied to the front portion of the vehicle. In this case, the rear side member 12 in the aforementioned embodiment can be replaced with a front side member.

Besides, in the aforementioned embodiment, the event of the offset collision of the rear portion of the vehicle has been described, but the effect of the disclosure is not limited thereto. Even in the event of a full-wrap collision or a minimal-wrap collision of the rear portion of the vehicle, the bumper reinforcement 20 can be restrained from rotating, and the reaction force surface thereof can be stabilized, by swiftly fitting the bumper reinforcement 20 to the rear side member 12.

What is claimed is:

1. A structure of a vehicle comprising:
    a side member that is arranged at each of both end portions of a front portion or a rear portion of the vehicle in a width direction of the vehicle, and that is extended with a length direction of the side member coinciding with a longitudinal direction of the vehicle;
    a crush box, the crush box assuming a cylindrical shape, one end of the crush box being fixed to an outer-end portion of the side member in the longitudinal direction of the vehicle, the crush box being arranged with a length direction of the crush box coinciding with the longitudinal direction of the vehicle, and the crush box being configured to plastically deform through compression in the longitudinal direction of the vehicle due to inputting of a collision load inward in the longitudinal direction of the vehicle; and
    a bumper reinforcement, arranged with a length direction of the bumper reinforcement coinciding with the width direction of the vehicle, at an outer-end portion side of the crush box in the longitudinal direction of the vehicle,
    the other end of the crush box being fixed to an inner side of the bumper reinforcement in the longitudinal direction of the vehicle,
    the bumper reinforcement being provided with a hat-shaped open cross-section where a recess portion recessed outward with respect to the vehicle is provided in an inner surface of the bumper reinforcement in the longitudinal direction of the vehicle,
    a size of an open-end portion of the recess portion in a vertical direction of the vehicle being set larger than a size of the side member in the vertical direction of the vehicle, and
    the size of the open-end portion of the recess portion in the vertical direction of the vehicle being set larger than a size of the crush box in the vertical direction of the vehicle.

2. The structure of the vehicle according to claim 1, wherein a size of the recess portion in the vertical direction of the vehicle is set in such a manner as to increase from an outer-end portion of the recess portion in the longitudinal direction of the vehicle toward an inner-end portion of the recess portion in the longitudinal direction of the vehicle, in at least each of both side regions of the bumper reinforcement in the width direction of the vehicle.

3. The structure of the vehicle according to claim 1, wherein the size of the crush box in the vertical direction of the vehicle is set in such a manner as to decrease from the one end of the crush box in a length direction of the crush box that is fixed to the side member toward the other end of the crush box in the length direction of the crush box that is fixed to the bumper reinforcement.

4. The structure of the vehicle according to claim 1, wherein:
    a size of the recess portion in the vertical direction of the vehicle is set in such a manner as to increase from an outer-end portion of the recess portion in the longitudinal direction of the vehicle toward an inner-end portion of the recess portion in the longitudinal direction of the vehicle, in an outer region of the bumper reinforcement in the width direction of the vehicle; and
    the size of the recess portion in the vertical direction of the vehicle is set in such a manner as to become substantially constant from an outer-end portion of the recess portion in the longitudinal direction of the vehicle toward an inner-end portion of the recess portion in the longitudinal direction of the vehicle, in a central region of the bumper reinforcement in the width direction of the vehicle.

5. The structure of the vehicle according to claim 1, wherein a rear-end portion of the crush box in the longitudinal direction of the vehicle is inserted in the recess portion of the bumper reinforcement, and is directly linked with a longitudinal wall portion of a rear-end portion of the recess portion in the longitudinal direction of the vehicle.

* * * * *